United States Patent

Roberts

[15] 3,665,764
[45] May 30, 1972

[54] PROPELLER TYPE VELOCITY INDICATOR

[72] Inventor: Paul C. Roberts, Pasadena, Calif.
[73] Assignee: The United States of America as represented by the Secretary of the Navy
[22] Filed: Nov. 16, 1970
[21] Appl. No.: 89,963

[52] U.S. Cl. ................................................73/231, 73/187
[51] Int. Cl. ..........................................................G01f 1/10
[58] Field of Search...................73/231 R, 231 M, 185, 187, 73/518; 324/166

[56] References Cited

UNITED STATES PATENTS 2,934,947   5/1960   Buck ................................73/231 R X Primary Examiner—James J. Gill
Attorney—Richard S. Sciascia and Ervin F. Johnston

[57] ABSTRACT

A propeller type velocity indicator including a casing; a propeller shaft rotatably mounted through the casing with a portion of the shaft extending within the interior of the casing and a portion extending exterior of the casing; a propeller mounted on the exterior portion of the shaft; the interior portion of the propeller shaft having an irregularity; a needle mounted within the casing so as to engage the shaft and sense the irregularity thereof; and pickup means mounted within the casing and connected to the needle for converting vibrations of the needle into electrical signals.

5 Claims, 2 Drawing Figures

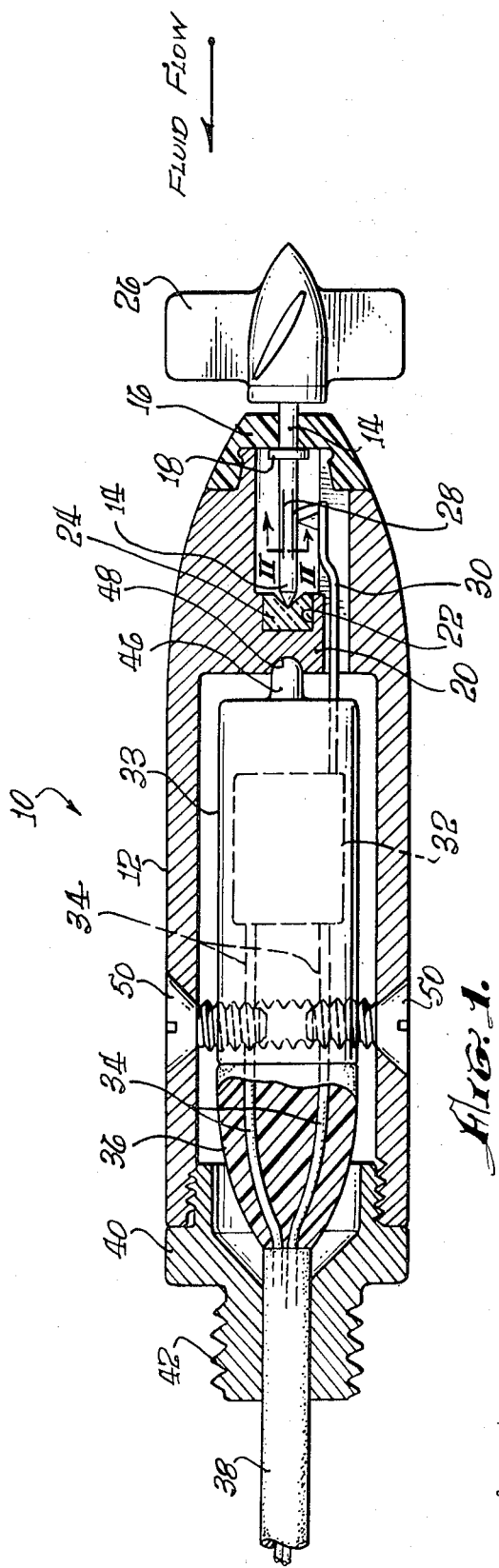
INVENTOR.
PAUL C. ROBERTS,
By ERVIN F. JOHNSTON,
ATTORNEY.

PROPELLER TYPE VELOCITY INDICATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Propeller type velocity indicators have been used in water tunnels, towed models, and buoyant body research for obtaining forward velocity data. In designing configurations for torpedoes and submarines it is necessary to obtain data regarding the velocity of water flow past these bodies. These bodies may be placed in a water tunnel or towed, and a velocity indicator is attached thereto for obtaining the data regarding velocity of water flow. The Navy has a need for an indicator which is quick to respond, capable of holding its calibration, and which will provide accurate water velocity data independent of the depth of operation. In the prior art, magnetic means or photo responsive means has been used for indicating the rpm of the propeller shaft. One magnetic indicator utilizes a wire coil for sensing passage of a flattened portion on the propeller shaft. This device has been quite large, expensive, and has excessive shaft friction. Another magnetic indicator utilizes a series of coils mounted within a casing for sensing rotation of an iron core which is mounted to the propeller shaft. The response of this device has been excellent, however, end play in the shaft causes a signal change, and the device is expensive. Still another indicator has utilized a light on one side of the shaft and a photo sensitive diode on the other side of the shaft with a shaft aperture therebetween. This indicator has a poor response at high rpm and fades out when grease or dirt gets into the operating area. None of these prior art indicating devices will indicate direction of rotation of the propeller shaft. Indication of direction of rotation is important where there is a possibility of flow reversals.

SUMMARY OF THE INVENTION

The present invention provides a highly reliable propeller type velocity indicator which has a minimum of shaft friction and is insensitive to any end play of the shaft. This has been accomplished by providing a velocity indicator which has a casing; a propeller shaft rotatably mounted through the casing with a portion of the shaft extending within the interior of the casing and a portion extending exterior of the casing. A propeller is mounted on the exterior portion of the shaft and the interior portion of the propeller shaft has an irregularity which may be a longitudinal score. A needle is mounted within the casing so as to engage the shaft and sense the irregularity thereof. Pickup means is mounted within the casing and connected to the needle for converting vibrations of the needle into electrical signals so that these signals will enable an indication of fluid flow past the indicator. By providing the propeller shaft with at least three longitudinal scores, which are unequally spaced from one another, the direction of rotation of the shaft can be determined. This velocity indicator may be attached to a submerged body and will provide signals for a recorder which will indicate the velocity of the water passing the submerged body. The velocity indicator would also have broad application for use in rivers where it may be mounted by an arm or similar means below the surface of the water, or in channels or pipes.

STATEMENT OF THE OBJECTS OF THE INVENTION

An object of the present invention is to overcome the aforementioned problems associated with prior art propeller type velocity indicators.

Another object is to provide a highly reliable propeller type velocity indicator which will more accurately sense velocity of fluid flow and the direction thereof.

A further object is to provide a propeller type velocity indicator which is inexpensive to construct, has a minimum of shaft friction, and is insensitive to end play of the shaft.

Other objects and many of the attendant advantages of this invention will be more readily appreciated as it becomes better understood by reference to the description and accompanying drawings which follow.

BRIEF DESCRIPTION OF THE DRAWING

FIG. 1 is a longitudinal cross sectional view through a preferred embodiment of the propeller type velocity indicator.

FIG. 2 is a view taken along plane II—II of FIG. 1.

DESCRIPTION OF THE PREFERRED EMBODIMENT

Referring now to the drawing wherein like reference numerals designate like or similar parts there is shown in FIG. 1 a propeller type velocity indicator 10 which may include a generally cylindrical shaped casing 12. A propeller shaft 14 is rotatably mounted through a forward end of the casing with a portion of the shaft extending within the interior of the casing and a portion of the shaft extending exterior of the casing. The means for rotatably mounting the propeller shaft in the casing 12 may be a snap-on bearing 16 which may be constructed of any suitable material, such as Teflon. A retainer ring 18 on the shaft just interior of the bearing 16 will retain the shaft's longitudinal position. The interior of the casing 12 may be provided with an inwardly extending abutment 20 which has a forward cavity 22. A jewel bearing 24 may be mounted within the cavity 22 so as to engage a needle point interior end of the propeller shaft 14. A propeller 26 is mounted on the end of the exterior portion of the shaft 14. The nose or forward end of the casing, including the propeller bearing 16, may be ballistically shaped as shown in FIG. 1. With this configuration, and the arrangement of the propeller shaft bearings, the propeller shaft is adapted for operative rotation when the water flow comes from the right of the figure. This will cause the needle point interior end of the shaft 14 to bear against the jewel bearing 24.

The interior portion of the propeller shaft 14 may be provided with an irregularity, such as a longitudinal score 28. As illustrated in FIG. 2, the interior portion of the propeller shaft may be provided with at least three longitudinal scores 28. The circumferential spacing between all of the adjacent longitudinal scores are unequal. As will be described in more detail hereinafter, this unequal spacing provides a coding which will indicate direction of rotation of the propeller shaft 14.

A needle 30, such as a phonograph needle, is mounted within the casing 12 so as to engage the propeller shaft 14 and sense the passage of the longitudinal scores 28. The needle is connected to a pickup means 32 which is also mounted within the casing 12. The pickup means 32 may be a crystal cartridge, magnetic pickup, reluctance coil, or the like for converting the mechanical movements or vibrations of the needle 30 into electrical signals. The pickup means may be mounted within a pressure housing 33. These electrical signals may be fed by a pair of wires 34 to an exterior recorder (not shown). These wires 34 may be potted to the aft end of the housing 33 by potting compound 36 and may form into cable 38 which exits the aft end of the casing through fitting 40. The fitting 40 may be provided with external threads 42 for mounting the velocity indicator 10 to a submerged body which is to be tested.

It is highly desirable that a means be mounted in the casing 12 for adjusting the pressure of the needle 30 on the propeller shaft 14. The adjusting means may include the pressure housing 33 which may be mounted in a particular fashion within the casing 12. A forward end of the pickup housing 33 may be provided with a projection 46 which is connected by any suitable means, such as a ball and socket joint 48, to the casing abutment 20. Alternatively, the projection 46 could be fixedly connected to the abutment 20 and made sufficiently resilient to allow displacement of the opposite end of the pickup housing 33. A threaded means, such as a countersunk bolt 50 extends through a side of the casing 12 for selectively laterally displacing the aft end of the pickup housing 33. The bolt 50 may be threaded directly into the aft end portion of the housing 33 for making this adjustment, and if desired a similar bolt 50 my be threaded into the housing 33 from an opposite side thereof. When the aft end of the housing 33 is laterally displaced this will change the pressure of the needle 30 on the propeller shaft as desired. After this adjustment is made the velocity indicator 10 should be calibrated in a known velocity of fluid flow so that this velocity can be determined on the recorder in terms of shaft revolution. It should be noted that the pickup housing 33 may be a pressure type housing so that the velocity indicator 10 may be utilized for determining velocity flow of fluids under high pressure conditions.

In the operation of the present invention, the velocity indicator 10 is placed within a fluid environment, such a water, for sensing the velocity of fluid flow. The indicator may be mounted by the threads 42 on a submerged model of a body, such as a torpedo or submarine. The indicator 10 may be also utilized for sensing velocity of water flow within a river, channel, or pipe. In a river the indicator would be mounted below the surface of the water by an arm or strut. The orientation of the indicator is with the propeller 26 located in an upstream position, as illustrated in FIG. 1. When the fluid flow is impressed upon the impeller 26 the shaft 14 rotates an the needle 30 is slightly moved by the passage of each longitudinal score 28. If at least three longitudinal scores 28 with unequal spacing are utilized, as illustrated in FIG. 2, the direction of rotation of the propeller shaft 14 can be sensed by the recorded data of the needle 30. This arrangement becomes important where a reversal of fluid flow may be possible. The pickup unit 32 converts the mechanical movements of the needle 30 into electrical signals which are fed over the wires 34 to an external recorder (not shown). After a period of time an operator will utilize the record to obtain overall velocity flow data within the environment under test. Pressure of the needle 30 upon the shaft 14 may be easily and precisely adjusted by selectively threading the bolts 50. If the velocity indicator is to be utilized in a high pressure environment the pickup housing 33 would be of pressure type.

It is now readily apparent that the present invention provides a highly reliable propeller type velocity indicator which is inexpensive to construct and highly sensitive to various fluid velocity flows. The indicator may be used for sensing velocity of practically any type of fluid and is adapted for high level research work, such as fluid flow past ships or submarines, and obtaining data of water flow within rivers, channels, or pipes.

Obviously many modifications and variations of the present invention are possible in the light of the above teachings. It is therefore to be understood that within the scope of the appended claims the invention may be practiced otherwise than as specifically described.

I claim:
1. A propeller type velocity indicator comprising:
   a casing;
   a propeller shaft rotatably mounted through the casing with a portion of the shaft extending within the interior of the casing and a portion of the shaft extending exterior of the casing;
   a propeller mounted on the exterior portion of the shaft; the interior portion of the propeller shaft having an irregularity;
   a needle mounted within the casing so as to engage the shaft and sense the irregularity thereof;
   pick-up means mounted within the casing and connected to the needle for converting vibrations of the needle into electrical signals,
   means mounted in the casing for adjusting the pressure of the needle on the propeller shaft; and
   the adjusting means including: the pick-up means being mounted in a housing; one end of the pick-up housing being connected to the interior of the casing; and
   threaded means extending through a side of the casing for selectively laterally displacing an opposite end of the pick-up housing so that lateral displacement of said opposite end of the pick-up housing changes the pressure of the needle on the propeller shaft.

2. A propeller type velocity indicator as claimed in claim 1 including
   the connection of said one end of the pick-up housing being a ball and socket joint; and
   the threaded means being a bolt which is threaded into the pick-up housing.

3. A propeller type velocity indicator as claimed in claim 2 including:
   said irregularity on the propeller shaft being a longitudinal score.

4. A propeller type velocity indicator as claimed in claim 3 including:
   the propeller shaft having at least three longitudinal scores; and
   the circumferential spacing between all of the longitudinal scores being unequal.

5. A propeller type velocity indicator as claimed in claim 4 including:
   a jewel bearing mounted in the casing; and
   the interior end of the propeller shaft being mounted in said jewel bearing.

* * * * *